(12) United States Patent
Giger

(10) Patent No.: US 6,859,744 B2
(45) Date of Patent: Feb. 22, 2005

(54) METHOD AND DEVICE FOR CARRYING OUT FREQUENCY SYNTHESIS IN A DISTANCE MEASURING DEVICE

(75) Inventor: Kurt Giger, Rüthi (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 10/446,786

(22) Filed: May 29, 2003

(65) Prior Publication Data

US 2003/0204345 A1 Oct. 30, 2003

Related U.S. Application Data

(63) Continuation of application No. PCT/CH01/00654, filed on Nov. 8, 2001.

(30) Foreign Application Priority Data

Nov. 30, 2000 (CH) .............................................. 2333/00

(51) Int. Cl.[7] .............................................. G01S 17/32
(52) U.S. Cl. .......................... 702/75; 702/97; 702/158; 702/159; 331/57
(58) Field of Search .................... 702/75–79, 158–159; 331/57

(56) References Cited

U.S. PATENT DOCUMENTS

| | | | | |
|---|---|---|---|---|
| 4,584,477 A | * | 4/1986 | Yoshino et al. .............. 250/351 |
| 5,233,316 A | * | 8/1993 | Yamada et al. ................ 331/45 |
| 5,438,300 A | * | 8/1995 | Saban et al. .................... 331/16 |
| 5,471,176 A | * | 11/1995 | Henson et al. ............... 331/1 A |
| 5,490,182 A | * | 2/1996 | Arai ............................ 375/376 |
| 5,561,692 A | * | 10/1996 | Maitland et al. ............. 375/371 |
| 5,668,504 A | * | 9/1997 | Rodriques Ramalho .... 331/1 A |
| 5,745,442 A | * | 4/1998 | Herscher ..................... 368/118 |
| 5,751,775 A | * | 5/1998 | Fensch et al. ............... 375/371 |
| 5,838,755 A | | 11/1998 | Tammelin |
| 5,889,436 A | * | 3/1999 | Yeung et al. ................... 331/2 |
| 5,933,224 A | * | 8/1999 | Hines et al. ............... 356/4.01 |
| 6,009,534 A | * | 12/1999 | Chiu et al. ................... 713/503 |
| 6,025,745 A | * | 2/2000 | Lee et al. ..................... 327/277 |
| 6,127,898 A | * | 10/2000 | Naura .......................... 331/57 |
| 6,359,519 B1 | * | 3/2002 | Farrow ......................... 331/57 |
| 6,463,393 B1 | | 10/2002 | Giger |
| 6,546,048 B1 | * | 4/2003 | Ichiba et al. ................. 375/238 |
| 6,556,249 B1 | * | 4/2003 | Taylor et al. ................ 348/497 |
| 6,687,321 B1 | * | 2/2004 | Kada et al. .................. 375/376 |
| 6,711,227 B1 | * | 3/2004 | Kaylani et al. .............. 375/372 |

FOREIGN PATENT DOCUMENTS

| | | | | |
|---|---|---|---|---|
| AU | 199748678 B2 | * | 5/1998 | .......... G01S/7/497 |
| CH | 551628 | * | 7/1974 | ............. G01S/9/62 |
| DE | 19643287 | | 4/1998 | |
| DE | 19811550 | | 9/1999 | |
| GB | 2 336 493 | | 2/1999 | |
| GB | 2336493 A | * | 10/1999 | ........... H03B/21/02 |

\* cited by examiner

Primary Examiner—Patrick Assouad
Assistant Examiner—Jeffrey R West
(74) Attorney, Agent, or Firm—Burns, Doane, Swecker & Mathis, L.L.P.

(57) ABSTRACT

In a method and a device for carrying frequency synthesis, in particular in a distance measuring device based on the principle of evaluating the change over time in the phase of an electromagnetic radiation emitted by a radiation source and remitted by an object aimed at, a frequency, which is preferably furnished by a quartz oscillator, is regulated in a ring oscillator with N delay elements ($V_1, V_2, V_3, \ldots, V_N$) to a desired first high frequency (F), which is used as a mixer frequency or as a modulation frequency. The signals at the N delay elements ($V_1, V_2, V_3, \ldots, V_N$) are delivered to a multiplexer, which is switched over with a cadence that is equivalent to 2*N times the frequency of the low-frequency measurement signal to be evaluated to produce a modulation frequency or mixer frequency.

25 Claims, 4 Drawing Sheets

METHOD AND DEVICE FOR CARRYING OUT FREQUENCY SYNTHESIS IN A DISTANCE MEASURING DEVICE

This application claims priority under 35 U.S.C. §119 to Swiss Application 2333/00 filed in Switzerland on Nov. 30, 2000, and as a continuation application under 35 U.S.C. §120 to PCT/CH01/00654 filed as an International Application on Nov. 8, 2001 designating the U.S., the entire contents of which are hereby incorporated by reference in their entireties.

BACKGROUND

1. Field

The invention relates to a method and a device for carrying out frequency synthesis in a distance measuring device. The invention also relates to a distance measuring device.

2. Background Information

In construction surveying or in interior construction, for instance for three-dimensional measurement of rooms, electronic distance measuring devices are often used. They have a distance measurement range of several tens of meters and are often embodied as handheld devices. Other areas of application for distance measuring devices are geodetic and industrial surveying or measurement. The fundamental principle of distance measurement with the known devices is based on the evaluation of a change over time in a parameter of the electromagnetic radiation emitted by the device and remitted by an object aimed at. To that end, the distance measuring device is equipped with an emitter for emitting an intensity-modulated radiation. In handheld devices, this is predominantly an optical radiation in the visible wavelength spectrum, to make it easier to aim at the measurement points. The optical radiation is remitted or scattered by the measurement object being aimed at and is recorded in a receiver built into the device. From the time lag of the received modulated radiation compared to the radiation emitted by the emitter, the distance from the measurement object is obtained.

In the known distance measuring devices, pin photodiodes or avalanche photodiodes are typically used as detectors, for converting the radiation remitted or scattered by the measurement object into electrical signals. Distance measuring devices whose distance determination is based on the measurement principle known as phase measurement are very commonly used. In such devices, the electrical signal received has a mixer frequency superimposed on it to produce a low-frequency measurement signal, directly at the avalanche photodiode or downstream of a preamplifier. The phase of this low-frequency signal is determined and compared with the phase of a reference signal. The difference in the measured phase of the low-frequency measurement signal and the phase of the reference signal is a standard for the distance of the measurement object.

For employing the measurement principle based on the evaluation of the phase difference, a laser modulation frequency preferably higher than 100 MHz, and a mixer frequency that differs from the laser modulation frequency only by the amount of the low frequency, are needed. It is substantially easier to determine the phase of the low-frequency measurement signal than to determine it from the original high-frequency signal received. Typically, therefore, the low frequency is selected to be in the kilohertz range, such as 10 kHz. If the laser modulation is done at a high frequency of 400 MHz, for instance, then to generate the desired low-frequency measurement signal a mixer frequency must be generated that differs from the high frequency by only 25 ppm. To that end, the highest possible crosstalk damping is required for both high frequencies. With such high frequencies located so close together, unwanted sidebands, however, can only, if at all, be supressed at extraordinarily high filtration effort and expense. Such provisions are expensive and often create further sources of error.

In most of the devices known from the prior art, the two high frequencies are generated with two separate quartz oscillators. One of the two quartz oscillators is voltage-controlled and is regulated in a phase locked loop (PLL) to the frequency that differs from the high frequency of the other quartz oscillator by the amount of the low frequency. The quartz oscillators used to generate the two high frequencies must match one another within very close tolerances. To assure the close tolerances, complicated and expensive production methods are required. Moreover, quartz oscillators can be usefully produced economically only for frequency ranges of approximately 100 MHz. For modulation frequencies greater than 100 MHz, additional frequency multipliers are needed, which entail additional costs. Alternative ways of achieving the generation of high frequencies on the far side of 100 MHz employ surface acoustic wave (SAW) resonators or filters in addition to the quartz oscillator.

Another known principle for generating the modulation high frequency and the mixer frequency differing only slight from it is direct digital synthesis (DDS). In this method, with a quartz oscillator, a frequency is generated that is multiplied electronically. From the thus-attained frequency, with the aid of a digital phase accumulator, a cosine table, and a digital/analog converter following it, the mixer frequency that differs by the low frequency is generated. To generate the actual high frequencies for the modulation frequency and the mixer frequency, further frequency multipliers are required. This variant way of generating the two high frequencies does require only a single quartz oscillator. However, the method is very complicated in terms of circuitry, and because of the many electronic components required, it has high current consumption. This is a decisive disadvantage, however, especially for relatively inexpensive handheld devices.

SUMMARY

A method and an apparatus are to be furnished with which the high frequencies required for the modulation frequency and for the mixer frequency can be generated simply and economically. The generation of the high frequencies should be done with the requisite precision and should have low current consumption, so that their use with handheld devices remains assured. The frequency generator should require only little space, so that the size of the device can be reduced. Advantageously, the design of the frequency generator should enable economical, replicable mass production.

This is attained in a method for carrying out frequency synthesis, particularly in a distance measuring device.

A method for carrying frequency synthesis, in particular in a distance measuring device based on the principle of evaluating the change over time in the phase of an electromagnetic radiation emitted by a radiation source and remitted by an object aimed at, is based on the fact that a frequency, which can be furnished by a quartz oscillator, is regulated in a ring oscillator with N delay elements to a desired first high frequency, which is used as a mixer frequency or as a modulation frequency. The signals at the N delay elements are delivered to a multiplexer, which is switched over with a cadence that is equivalent to 2*N times the frequency of the low-frequency measurement signal to be evaluated. As a result, at the output of the multiplexer, a second high frequency differing from the first high frequency by the frequency of the low-frequency measurement signal is generated, which can be used as a modulation frequency or as a mixer frequency.

With the aid of the ring oscillator, a first high frequency, such as the mixer frequency, is generated. The demands for precision of the quartz oscillator are then not so high, and economical oscillating quartzes can be used. The actual high frequency is generated with the ring oscillator, which has N delay elements. If a delay element has a delay period of $t_d$, then the frequency $1/(2*10*t_d)$ is applied to the output of the ring oscillator. The voltage course at the individual delay elements is phase-displaced by one delay period each. If the multiplexer is now switched over at a cadence that amounts to N times the frequency of the low-frequency measurement signal to be evaluated, then the second high frequency, at the modulation output for the radiation source, loses exactly one high-frequency period during one low-frequency period. This means that the second high frequency, which is the modulation frequency, is less by precisely the frequency of the low-frequency measurement signal than the first high frequency, which is the mixer frequency. The low-frequency fluctuation frequency that occurs upon superposition of the mixer frequency and the modulation frequency does not in fact have a continuous signal course. The result is a signal with 2N stages, corresponding to twice the number of the delay elements in the ring oscillator. This is not a particular problem, given a high enough number of delay elements and given the use of a smoothing filter. The demands in terms of phase noise of the ring oscillator are relatively low, because after all, both high frequencies are derived from the same oscillator. The phase of the low frequency created in the receiver upon superposition is proportional to the difference in phase of the two high frequencies. Thus large proportions of the phase noise of the high-frequency oscillators drop away again in the receiver, since after all both phase noises are correlated with one another.

The number of delay elements in the ring oscillator defines the phase increments. The number of possible delay elements, however, can be limited by the requisite modulation frequency and possibly also by the production process for the ring oscillator. Conversely, if for reasons of precision smaller phase increments are required, then they can for instance be generated with a delay line at the output of the multiplexer. To that end, the second mixer frequency applied to the output of the multiplexer is delivered to a further array of delay elements and to a further multiplexer that is switched over at the cadence of the number of further delay elements, multiplied by the frequency of the low-frequency measurement signal, in order to subdivide the course phase increments applied to the first multiplexer into finer phase increments, and to attain a smoother low-frequency signal.

In an alternative variant for reducing the graduations in the low-frequency signal, the intermediate stages of the high frequency can be interpolated digitally. To that end, the output signal at the first multiplexer is not carried through a further delay circuit so as to be switched over directly from one phase increment to the next. Instead, the time between the individual phase increments is subdivided into further time slots, for instance into 8 time slots. In this time slot, the multiplexer is first switched fully to the lower stage. In the next time slot, in the example given, the multiplexer is switched to the higher and the lower phase stage at the ratio of 1/8 and 7/8, respectively. The ratio is then increased with each successive time slot. This results in ratios of 2/8 and 6/8, respectively, 3/8 and 5/8, respectively, and so forth. This process makes it possible with little effort to interpolate between the individual phase stages in order to obtain a smoothed signal course.

To regulate the modulation frequency or the mixer frequency to a multiple of the quartz frequency, the delay elements are embodied with voltage-controlled delay. In a phase locked loop (PLL), the ring oscillator frequency is regulated preferably to from 8 to 64 times the frequency of the quartz oscillator.

In a very simple and economical variant, bistable multivibrators, such as RS flipflops, inverters, or similar components are preferably used as the delay elements.

It proves especially advantageous to produce the ring oscillator and the multiplexer in an integrated semiconductor construction, preferably CMOS. The integrated semiconductor construction is economical, space-saving, and particularly in the CMOS construction requires very little energy. This is a decisive advantage, above all for battery-operated devices.

For attaining the high frequencies required with the desired fine graduation of the phase increments, a ring oscillator with from 8 to 32, for instance 16, delay elements proves to be advantageous.

The evaluation of the low-frequency measurement signal, and in particular the phase measurement, is done synchronously with an internal low-frequency synchronization frequency that is derived by a splitter from the mixer frequency. With increasing measurement distance, the phase of the reception signal shifts relative to the phase of the internal low-frequency synchronization signal. Because the delay elements are not ideal and because of other tolerances, it is in fact not possible, by switchover of the multiplexer, to generate absolutely uniform phase increments. The resultant systematic phase errors are reduced sharply by providing that the same distance is measured at different phase relationships relative to the internal synchronization signal and then these distances are averaged. This is very simple to accomplish, by starting the switchover process of the multiplexer not at input 1 but rather at some other input.

The device according to the invention for carrying out frequency synthesis is distinguished by an especially simple design. The means for generating a first high frequency include a quartz oscillator, which cooperates with a ring oscillator having N delay elements. The means for generating a second high frequency, differing from the first high frequency by the frequency of the low-frequency measurement signal, include a multiplexer, which can be switched over with a cadence which is equivalent to 2*N times the frequency of the low-frequency measurement signal. The demands in terms of precision of the quartz oscillator are not so high, making economical oscillating quartzes usable. The actual high frequency is generated with the ring oscillator, which has N delay elements. The demands in terms of phase noise of the ring oscillator are relatively low, because after all, both high frequencies are derived from the same oscillator. The phase of the low frequency created in the receiver upon superposition is proportional to the difference in phase of the two high frequencies. Thus large proportions of the phase noise of the high-frequency oscillators drop away again in the receiver, since after all both phase noises are correlated with one another.

The number of delay elements provides the requisite modulation frequency and the fineness of the phase increments. On the other hand, the number of delay elements also defines the number of stages of the low-frequency signal obtained from the superposition of the two high frequencies. For the ring oscillator, from 8 to 64, and for instance 16, delay elements prove to be expedient. If the ring oscillator is tuned to 400 MHz, for instance, and a low frequency of approximately 6.1 kHz is required, then 16 delay elements prove to be expedient. They are embodied for instance as RS flipflops. In order to obtain the required low frequency of 6.1 kHz from the high frequency of 400 MHz, the ring oscillator frequency is divided by the factor $2^{16}$. The multiplexer, which if there are 16 RS flipflops must have 32 inputs, must be switched over sequentially with a frequency that is higher by the factor of 32 than the low frequency. The result at the output of the multiplexer is a second high frequency that differs from the ring oscillator frequency by precisely the amount of the low frequency.

For the exact determination of the high frequency, the ring oscillator is equipped with a phase locked loop (PLL), by way of which the ring oscillator frequency can be regulated to a multiple of the frequency of the quartz oscillator, preferably from 8 to 64 times that frequency. The PLL reduces the phase noise of the ring oscillator by eliminating the low-frequency components of the phase noise in particular.

The possible number of delay elements is limited by the requisite modulation frequency and possibly also by the production process. If the graduation in the phase increments that obtains with the given number of delay elements is too coarse for the requisite precision, then the output of the multiplexer can be connected to a delay member, which has a ring oscillator with delay stages and a downstream multiplexer. In this way, from the coarse phase increments, the requisite finer phase graduations can be generated.

Integrating the frequency synthesizer on a semiconductor component proves to be especially advantageous. In particular, the ring oscillator and multiplexer are then produced by integrated semiconductor construction, such as CMOS technology. The thus-produced components can be arbitrarily reproduced and are economical to manufacture and, particularly with CMOS technology, have low energy consumption.

A distance measuring device equipped according to the invention and based on the principle of phase measurement has an emitter for emission of an optical radiation, a receiving optical system for the optical measurement radiation remitted or scattered by an object to be measured, a photoelectric receiver downstream of the receiving optical system for converting the optical radiation into electrical measurement signals, and a signal processing system for comparing the measurement signals with reference signals and examining them for their phase relationship in order from that to determine the distance from the object being measured and make the result available to the user. The emitted radiation is modulated with a high-frequency modulation frequency. A high-frequency mixer frequency deviates from the modulation frequency by the frequency of the low-frequency measurement signal to be evaluated and superimposed on it is the electrical signal furnished by the receiver. The means for generating a high-frequency modulation frequency for the emitted optical radiation and a high-frequency mixer frequency, which differs from the modulation frequency and on which the electrical signals furnished by the photoelectric receiver can be superimposed, are embodied in accordance with the invention or one of its modifications. This makes the production of the distance measuring device less expensive. Its dimensions can be kept small. Particularly in an integrated embodiment of the means for generating the high frequencies on one or more semiconductor components, preferably made by CMOS technology, the device also has reduced energy consumption. This is a major advantage, above for battery-operated handheld devices.

BRIEF DESCRIPTION OF THE DRAWINGS

The invention is described in detail below with reference to exemplary embodiments schematically shown in the drawings. Shown are.

DETAILED DESCRIPTION OF THE PREFERRED EMBODIMENTS

Figure 1:
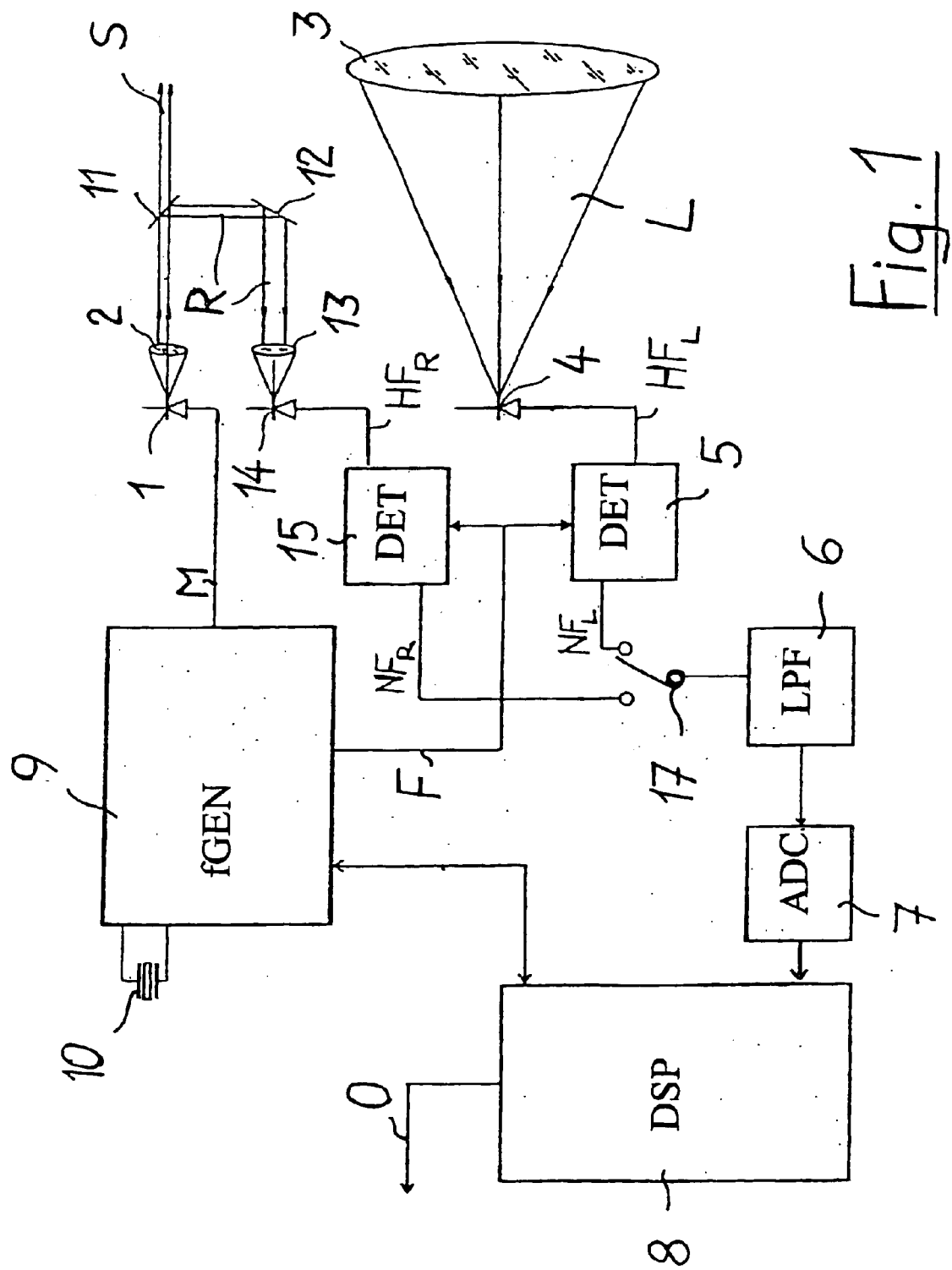
FIG. 1, a distance measuring device of the invention.

In FIG. 1, one example of a distance measuring device is shown, which is equipped with a device according to the invention for carrying out frequency synthesis. The distance measuring device has a laser source 1, which preferably emits visible laser radiation. The emitted laser radiation, collimated by a collimating optical system 2, is split by a beam splitter 11 into a measurement beam S and as a reference beam R. As an example, a partly transparent mirror can be used as the beam splitter 11. The measurement beam S reaches a measurement object whose distance from the distance measuring device is to be measured. The radiation L remitted or scattered by the measurement object is collected by a receiving optical system 3 and carried to a measuring receiver 4. A pin photodiode can be used, for instance, as the measuring receiver 4. The reference beam R is deflected by a deflecting mirror 12 and collected by an optical system 13 and carried to a reference receiver 14. The reference receiver 14 is advantageously structurally identical to the receiver 4 for the measurement beam L. The distance traveled by the reference beam R from the beam splitter 11 to the reference receiver 14 forms the reference distance required to determine the phase difference.

The optical radiation emitted by the laser source 1 has a high-frequency modulation frequency M impressed on it that is generated by a frequency synthesizer 9, which is triggered by a reference quartz oscillator 10. By means of the high-frequency modulation frequency M, high-frequency electrical measurement signals $HF_L$, $HF_R$, respectively, are generated at the receiver 4 and at the reference receiver 14, and they are present at the input of devices, embodied according to the invention, for signal detection; in FIG. 1, these devices are identified by reference numerals 5 and 15, respectively. The frequency synthesizer 9 also generates a control frequency F of a similarly high frequency, which is delivered via a connecting line to the two devices 5, 15 for signal detection and which indicates the cadence for both devices 5, 15. In the signal detection devices 5, 15, which will be described in further detail hereinafter, the high-frequency input signals $HF_L$, $HF_R$ are converted into low-frequency measurement signals $NF_L$ and calibration signals $NF_R$, respectively.

The low-frequency measurement signals $NF_L$ and calibration signals $NF_R$ present at the output of the two devices 5, 15 according to the invention for signal detection are delivered sequentially, via an analog switch 17, to a low-frequency filter 6, in which the remaining high-frequency signal components are filtered out. The filter is for instance an anti-aliasing filter. The filtered and amplified measurement signals and calibration signals $NF_L$ and $NF_R$, respectively, are digitized in an analog/digital converter 7 and are evaluated in terms of their phase relationship in a digital signal processing device 8. From the phase relationship, a conclusion is drawn as to the distance of the measurement object, and this is carried in the form of a signal O to an output unit. The control frequency F is advantageously selected such that F=(n*M)±NF. The control frequency F is thus an integral multiple of the modulation frequency M, plus or minus the value of the low-frequency signal NF. The value of n is greater than 0.

Figure 2:
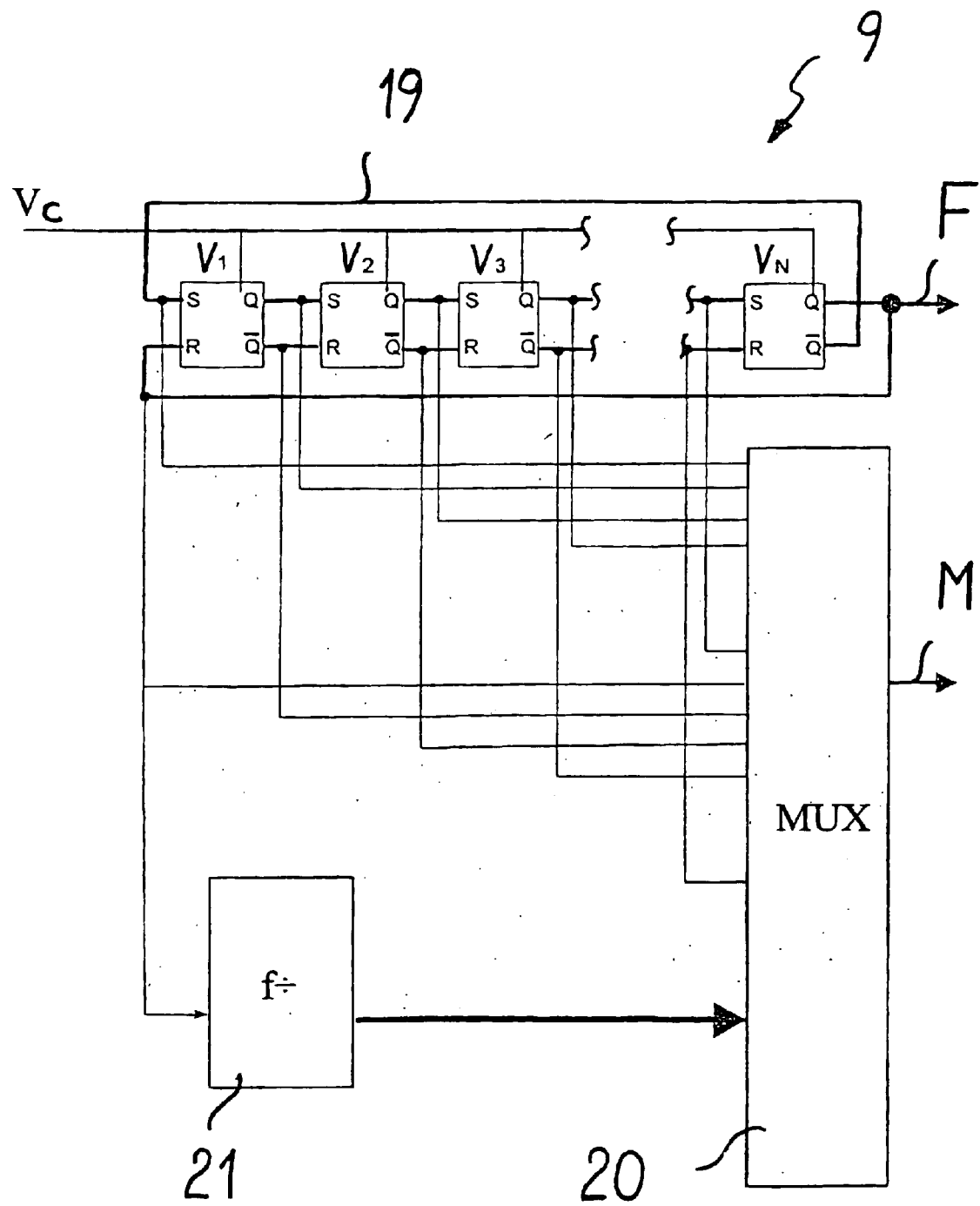
FIG. 2, a first exemplary embodiment of a device for carrying out frequency synthesis.

In FIG. 2, the frequency synthesizer is identified overall by reference numeral 9. It includes a ring oscillator 19 with N delay elements $V_1, V_2, V_3, \ldots, V_N$. The delay elements $V_1, V_2, V_3, \ldots, V_N$ have a delay which is controlled via a voltage $V_C$. By way of example, the delay elements $V_1, V_2, V_3, \ldots, V_N$ are bistable multivibrators, preferably RS flipflops. Instead of flipflops, inverters can also be used as the delay elements. The outputs of the delay elements $V_1, V_2, V_3, \ldots, V_N$ are connected to a multiplexer 20, which is triggered via a frequency divider 21. The voltage-controlled ring oscillator 19 is tuned to 400 MHz, for instance. This first high frequency serves for instance as a mixer frequency F. The ring oscillator 19 has 16 RS flipflops, for instance, as delay elements. To obtain a low frequency of approximately 6.1 kHz, the ring oscillator frequency is divided by the factor $2^{16}$ in the frequency divider 21. The multiplexer 20, which for 16 flipflops has 32 inputs, is sequentially switched over with a frequency that is higher by the factor of 32 than the desired low frequency. As a result, at the output of the multiplexer 20 there is a second high frequency M, which has a value that differs from the first high frequency F by the amount of the low frequency. This second high frequency serves for instance as the modulation frequency M for the laser.

Figure 3:
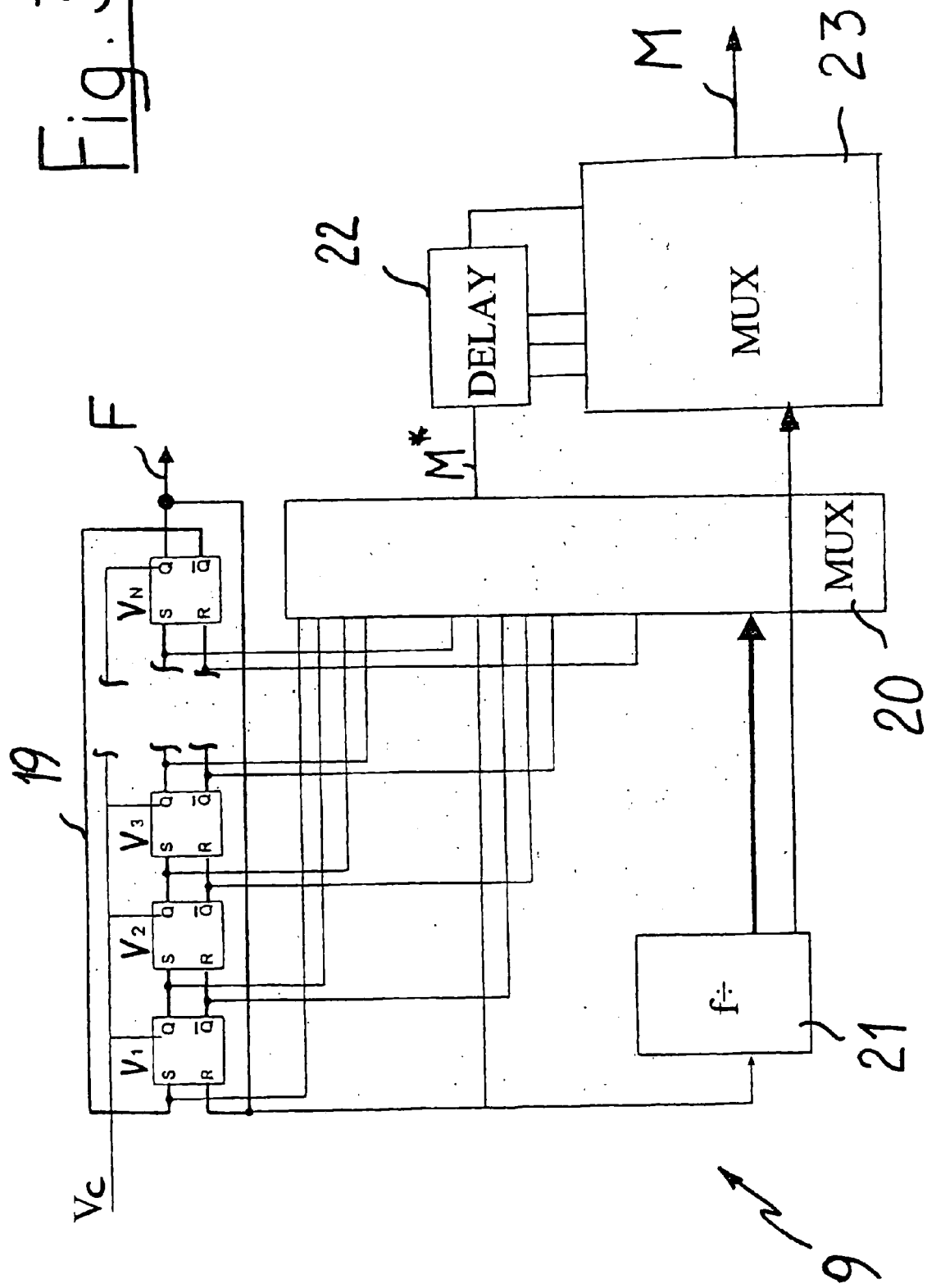
FIG. 3, a variant of the device of FIG. 2 for generating fine phase graduations.

The frequency synthesizer shown in FIG. 2 is prepared, in terms of its design, for integration with a semiconductor component. For instance, it is produced in a CMOS mode of construction. The possible number of delay elements $V_1, V_2, V_3, \ldots, V_N$ is limited by the semiconductor technology employed and by the requisite modulation frequency M. If for reasons of the precision demanded smaller phase increments are needed, then finer phase increments can be generated with a further delay line at the output of the multiplexer. This variant of the frequency synthesizer is shown in FIG. 3. In it, the high-frequency signal M* at the output of the multiplexer 20 is delivered to a further array of delay elements 22. The outputs of the delay elements are connected in turn to the inputs of a further multiplexer 23, which is also triggered by the frequency divider 21. By way of example, the delay elements 22 can also be noninverting buffers that are connected in series. Finally, the desired second high frequency M is present at the output of the further multiplexer 23. In an alternative variant that makes do without additional delay circuitry, the signals at the output of the multiplexer can also be digitally interpolated.

Figure 4:
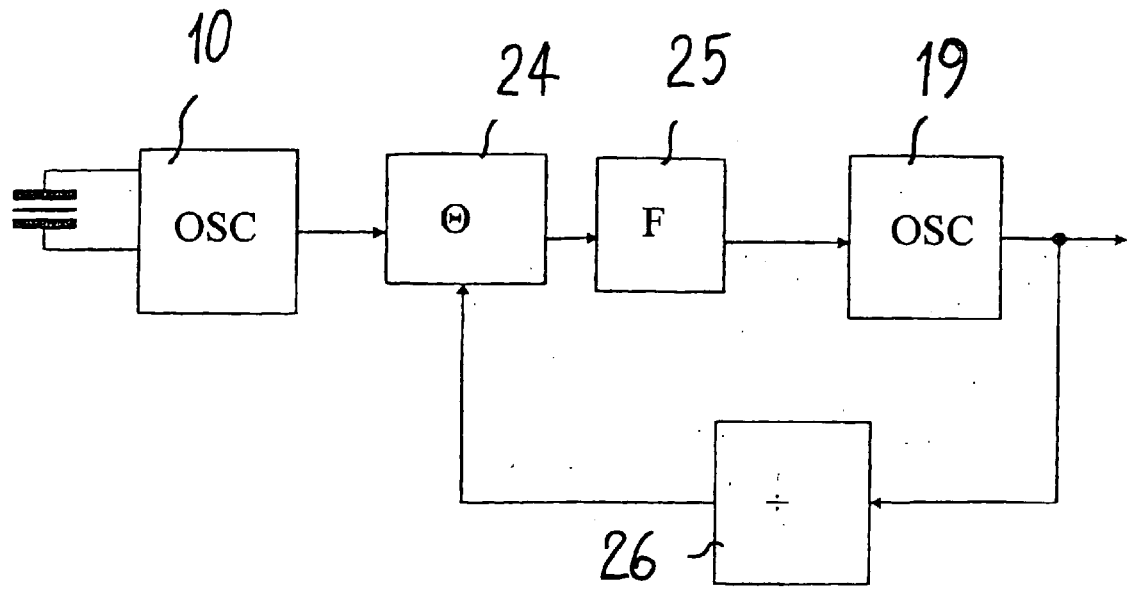
FIG. 4, an example of a control loop for a device for carrying out frequency synthesis.

To enable determining the distance with the requisite precision, the high frequencies must be regulated exactly. As indicated in FIG. 4, to that end the frequency of the ring oscillator 19 is regulated precisely to a multiple of the frequency of the quartz oscillator 10, for instance to from 8 to 64 times that frequency, by a phase locked loop, which comprises a phase detector 24, a loop filter 25, and a divider 26. By means of this control loop, the phase noise of the ring oscillator 19 is also reduced, since the quartz oscillator 10 furnishes a very low-noise signal, and above all the low-frequency phase noise components are eliminated.

Figure 5:
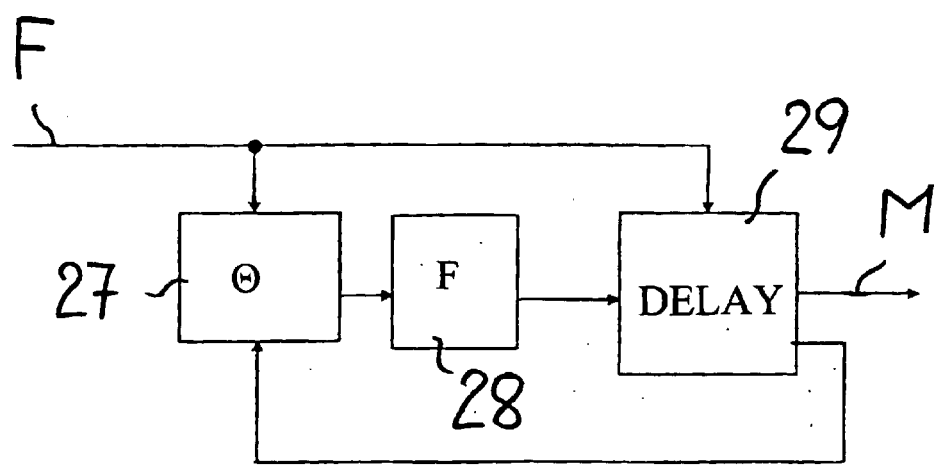
FIG. 5, a further variant of a device for carrying out frequency synthesis.

FIG. 5 shows a further variant embodiment of the frequency synthesizer. In this variant, the generation of the mixer frequency F and the modulation frequency M are separated completely from one another. By way of example, the mixer frequency F can be produced via a ring oscillator as in FIG. 2. The ring oscillator can be disposed in an integrated mode of construction on a separate semiconductor component. The mixer frequency is delivered to a phase detector 27. The signal of the phase detector 27, after passing through a loop filter 28, reaches a voltage-controlled delay array 29 with N delay elements and with a multiplexer. The mixer frequency F is also used to trigger the delay array 29. As a result, the desired modulation frequency M is present at the output of the delay array 29. Because of the spatial separation of the synthesis of the two high frequencies F, M, a markedly improved signal separation is achieved. Crosstalk is practically precluded.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for carrying out frequency synthesis in a distance measuring device based on a principle of evaluating a change over time in a phase parameter of electromagnetic radiation (S) emitted by a radiation source and remitted by an object at which it is aimed, comprising:

generating a high-frequency modulation frequency (M,M*) for the emitted electromagnetic radiation (S) and a high-frequency mixer frequency (F), on which the radiation remitted by the object and converted by a detector into high-frequency modulated electrical signals is superimposed and wherein the mixer frequency (F) differs from the modulation frequency by a frequency of a low-frequency measurement signal (NF) to be evaluated;

regulating a frequency furnished by a quartz oscillator in a ring oscillator with N delay elements ($V_1, V_2, V_3, \ldots, V_N$) to provide the desired high-frequency mixer frequency (F), signals at the N delay elements ($V_1, V_2, V_3, \ldots, V_N$) being delivered to a multiplexer which is switched over at a cadence that corresponds to 2*N times the frequency of the low-frequency measurement signal (NF); and generating at the output of the multiplexer, the high-frequency modulation frequency (M,M*), which differs from the high-frequency mixer frequency (F) by the frequency of the low-frequency measurement signal (NF).

2. The method of claim 1, wherein the high-frequency modulation frequency (M,M*) at the output of the multiplexer is delivered to a further array of delay elements and to a further multiplexer that is switched over at a cadence of the further array of delay elements, multiplied by the frequency of the low-frequency measurement signal (NF), to subdivide course phase increments applied to the first multiplexer into finer phase increments.

3. The method of claim 1, wherein the high-frequency modulation frequency at the output of the multiplexer is interpolated digitally.

4. The method of claim 1, wherein the delay elements ($V_1$, $V_2$, $V_3$, ..., $V_N$) are embodied with a voltage-controlled delay.

5. The method of claim 4, wherein the ring oscillator frequency is regulated with a phase locked loop (PLL) to a multiple of the frequency of the quartz oscillator.

6. The method of claim 1, wherein bistable multivibrators selected from the group consisting of RS flipflops, inverters, and components of similar function are used as the delay elements ($V_1$, $V_2$, $V_3$, ..., $V_N$).

7. The method of claim 1, wherein the ring oscillator and multiplexer are produced in integrated CMOS construction.

8. The method of claim 1, wherein a further ring oscillator together with the multiplexer is used for generating the high frequency modulation frequency (M,M*), and wherein the ring oscillator and the further ring oscillator are disposed on two different semiconductor components, and the mixer frequency (F), at one output of a first of the two semiconductor components, is applied to one input of a second of the two semiconductor components that has the multiplexer.

9. The method of claim 1, wherein the ring oscillator is equipped with from 8 to 64 delay elements ($V_1$, $V_2$, $V_3$, ..., $V_N$).

10. The method of claim 1, wherein evaluation of the low-frequency measurement signal is performed synchronously with an internal low-frequency synchronization frequency that is derived from the mixer frequency by a splitter.

11. A device for carrying out frequency synthesis in a distance measuring device based on a principle of evaluating change over time in a phase parameter of electromagnetic radiation (S) emitted by a radiation source and remitted by an object at which it is aimed, comprising:

means for generating a high-frequency modulation frequency (M,M*) for emitted electromagnetic radiation (S); and means for generating a high-frequency mixer frequency (F), on which the radiation remitted by an object and converted by a detector into high-frequency modulated electrical signals is superimposed and wherein the mixer frequency (F) differs from the modulation frequency by a frequency of a low-frequency measurement signal (NF) to be evaluated, wherein the means for generating a first high frequency mixer frequency (F) include a quartz oscillator, which cooperates with a ring oscillator having N delay elements ($V_1$, $V_2$, $V_3$, ..., $V_N$), and wherein the means for generating the high frequency modulation frequency (M,M*), differing from the mixer frequency (F) by the frequency of the low-frequency measurement signal (NF), includes a multiplexer, which is switched over with a cadence which is equivalent to 2*N times the frequency of the low-frequency measurement signal (NF), such that the high frequency modulation frequency (M,M*) is generated at an output of the multiplexer.

12. The device of claim 11, wherein the delay elements ($V_1$, $V_2$, $V_3$, ..., $V_N$) of the ring oscillator are voltage-controlled and include bistable multivibrators selected from a group consisting of RS flipflops, inverters, and components of similar function.

13. The device of claim 11, wherein a number of delay elements ($V_1$, $V_2$, $V_3$, ..., $V_N$) of the ring oscillator is from 8 to 64.

14. The device of claim 11, wherein the ring oscillator has a phase locked loop (PLL), by way of which the ring oscillator frequency is regulated to a multiple of 8 to 64 times the frequency of the quartz oscillator.

15. The device of claim 11, wherein the output of the multiplexer is connected to a delay member, which includes a further ring oscillator with delay elements and a downstream multiplexer.

16. The device of claim 11, wherein the output of the multiplexer is connected to a device for digital interpolation of the high-frequency modulation frequency.

17. The device of claim 11, wherein the ring oscillator and multiplexer are produced in integrated CMOS construction.

18. The device of claim 17, wherein the means for generating the mixer frequency (F) and the means for generating the modulation frequency are disposed on separate integrated semiconductor components.

19. A distance measuring device which operates based on a principle of phase measurement using the frequency synthesis device of claim 11, the system comprising:

an emitter for emission of the electromagnetic radiation (S);

a receiving optical system for measurement radiation (L) remitted or scattered by the object to be measured;

a photoelectric receiver downstream of the receiving optical system for converting the radiation (L) into electrical measurement signals;

a signal processing system for comparing the measurement signals with reference signals and examining them for their phase relationship to determine a distance from the object being measured and to make a result regarding the distance available to the user; and means for generating the high-frequency modulation frequency for the emitted radiation (S) and the high-frequency mixer frequency (F) which differs from the modulation frequency and on which the electrical signals furnished by the photoelectric receiver is superimposed.

20. The method of claim 4, wherein the ring oscillator frequency is regulated with a phase locked loop (PLL) to 16 times the frequency of the quartz oscillator.

21. The method of claim 1, wherein the ring oscillator is equipped with 16 delay elements ($V_1$, $V_2$, $V_3$, ..., $V_N$).

22. Device of claim 19, wherein the delay elements ($V_1$, $V_2$, $V_3$, ..., $V_N$) of the ring oscillator are voltage-controlled and include bistable multivibrators selected from a group consisting of RS flipflops, inverters, and components of similar function.

23. Device of claim 19, wherein the ring oscillator has a phase locked loop (PLL), by way of which the ring oscillator frequency is regulated to a multiple of 8 to 64 times the frequency of the quartz oscillator.

24. Device of claim 19, wherein the output of the multiplexer is connected to a delay member, which includes a further ring oscillator with delay elements and a downstream multiplexer.

25. Device of claim 19, wherein the output of the multiplexer is connected to a device for digital interpolation of the high-frequency modulation frequency.

* * * * *